T. M. WOODHULL.
BASKET.
APPLICATION FILED OCT. 18, 1920.
1,418,508.
Patented June 6, 1922.
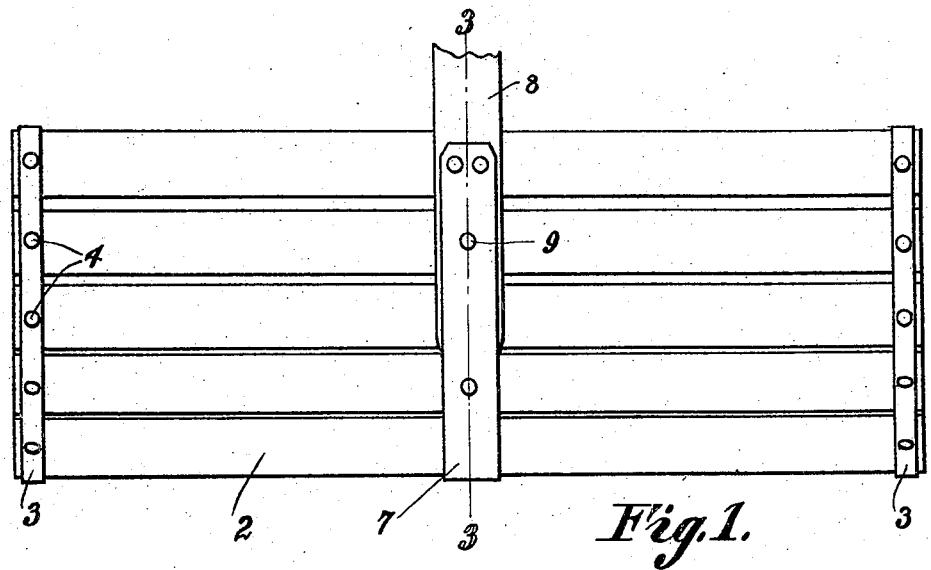
Fig.1.
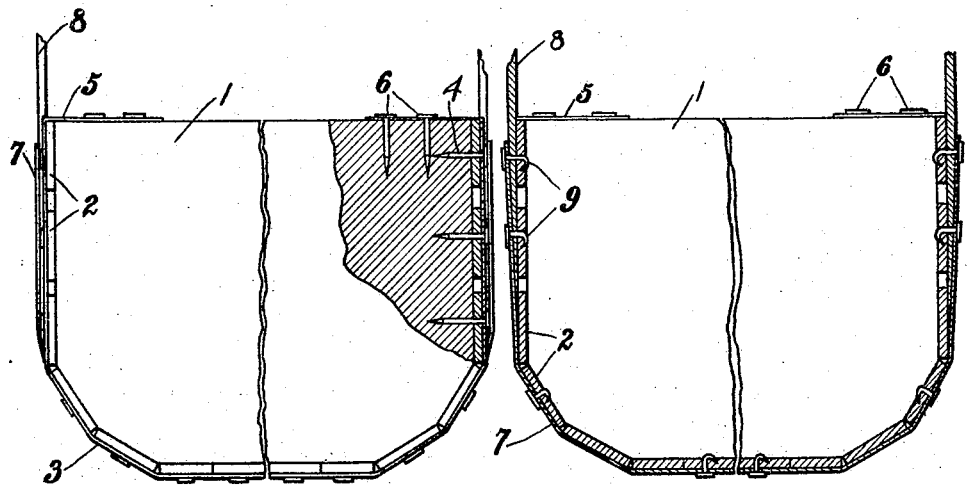
Fig.2.  Fig.3.
Inventor
T. M. Woodhull
Attorney

UNITED STATES PATENT OFFICE.

TIMOTHY MILLER WOODHULL, OF SWANSBORO, NORTH CAROLINA.

BASKET.

1,418,508.　　　　Specification of Letters Patent.　　Patented June 6, 1922.

Application filed October 18, 1920. Serial No. 417,678.

*To all whom it may concern:*

Be it known that I, TIMOTHY M. WOODHULL, a citizen of the United States, residing at Swansboro, in the county of Onslow and State of North Carolina, have invented a new and useful Basket, of which the following is a specification.

This invention relates to baskets, one of its objects being to provide a basket the parts of which can be readily assembled to form a durable structure of maximum capacity, it being possible to make baskets readily in different sizes from a slatted fabric permanently attached to solid heads.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of the basket a part of the handle being removed.

Figure 2 is an end elevation, a part being removed and a portion shown in section.

Figure 3 is a section on line 3—3, Figure 1.

Referring to the figures by characters of reference 1 designates wooden heads which can be of any desired configuration. The body portion of the basket is made up of parallel slats 2 connected at their ends by bendable straps 3 of metal or the like which are fastened to the slats by nails 4. These nails enter the edges of the heads so as to hold the slats, straps and heads properly assembled. The ends of the straps are folded downwardly onto the tops of the heads so as to form tongues 5 which are fastened to the heads by nails 6.

Another strap of metal or the like and which has been indicated at 7 is secured to the slats 2 at the centers thereof, the ends of this strap 7 lapping and being nailed to the ends of a bail 8 which bridges the middle portion of the basket and forms a handle. It will be noted that certain of the nails 9 used for securing the strap 7 in place are also used for fastening the bail and thus serve to hold the strap, bail and straps together. These nails are preferably clinched as shown in Figure 3.

Obviously a basket such as described is easy to manufacture, is light and durable, and can be made of various shapes simply by changing the contour of the heads.

What is claimed is:—

A basket comprising heads, slats secured at their ends to the heads, a bail extending over the middle portion of the basket and having its ends lapping the upper slats at each side of the basket but terminating above the bottom slat, and a strap extending under the middle portion of the basket and having its ends lapping the ends of the bail, and fastening means extending through the ends of the strap and through the ends of the bail for fastening them together and to the adjacent slats, said strap constituting means for transmitting the weight of the basket and its contents from the bottom portion thereof to the end portions of the bail.

In testimony that I claim the foregoing as my own, I have hereto affixed my signature in the presence of two witnesses.

TIMOTHY MILLER WOODHULL.

Witnesses:
　W. J. DAVIS,
　C. S. PITTMAN.